(12) United States Patent
Chu

(10) Patent No.: US 7,073,710 B2
(45) Date of Patent: Jul. 11, 2006

(54) METHOD OF PURCHASING REFILL UNITS ONLINE

(75) Inventor: En-Ting Chu, 5F, No. 31, Lane 108, Le-Yei St., Taipei City (TW)

(73) Assignee: En-Ting Chu, Taipei (TW)

( * ) Notice: Subject to any disclaimer, the term of this patent is extended or adjusted under 35 U.S.C. 154(b) by 162 days.

(21) Appl. No.: 10/709,025

(22) Filed: Apr. 7, 2004

(65) Prior Publication Data

US 2005/0224576 A1    Oct. 13, 2005

(51) Int. Cl.
*G06F 7/08* (2006.01)
*G06K 5/00* (2006.01)

(52) U.S. Cl. ........................ 235/381; 235/380
(58) Field of Classification Search ............... 235/380, 235/381; 705/26, 64–66

See application file for complete search history.

(56) References Cited

U.S. PATENT DOCUMENTS

| | | | |
|---|---|---|---|
| 2003/0050043 A1* | 3/2003 | Ohrstrom et al. | 455/406 |
| 2003/0162525 A1* | 8/2003 | Stefan et al. | 455/405 |
| 2004/0123323 A1* | 6/2004 | Russo | 725/88 |
| 2005/0034116 A1* | 2/2005 | Rodriguez et al. | 717/174 |

* cited by examiner

*Primary Examiner*—Thien M. Le
*Assistant Examiner*—April Taylor
(74) *Attorney, Agent, or Firm*—Winston Hsu

(57) ABSTRACT

A method of purchasing value units required for utilizing a paid function of a software program residing on a first computer. The method includes the first computer initiating an order with a second computer for a quantity of value units to be purchased. The software program receives a serial number from the second computer and stores the serial number in a memory of the first computer. The second computer transmits a refill file to the memory, the refill file indicating the quantity of value units purchased and a confirmation number corresponding to the serial number. The refill file is loaded from the memory into the software program, and the confirmation number is compared with the serial number. If the confirmation number matches the serial number, the quantity of value units purchased is added to a previous total of value units and the serial number is permanently deleted from the memory.

10 Claims, 3 Drawing Sheets

METHOD OF PURCHASING REFILL UNITS ONLINE

BACKGROUND OF INVENTION

1. Field of the Invention

The present invention relates to a method of purchasing refill units, and more specifically, to a method for purchasing refill units online and using the refill units to execute local software.

2. Description of the Prior Art

Due to the increasing popularity of the Internet, many business transactions can now be performed online. For example, some software packages can perform a paid function a certain amount of times before an original number of purchased units has been exhausted. Every time the paid function is executed, the number of remaining purchased units is decreased by one. The purchased units may be included with the original software package, or may be bought separately by a user of the software package. Nevertheless, when all of the purchased units have been exhausted, the user must purchase refill units in order to keep using the paid function of the software package.

The Internet has become a preferred medium for purchasing refill units due to the speed and convenience offered. When purchasing refill units, the user will fill out an order form on a secure web site to indicate a number of refill units to be purchased and to provide billing information such as a credit card number. After the purchase has been verified, the web site will display a serial number that the user may use to receive the purchased refill units. The user can then enter the serial number into a user interface of the software program in order to increase the available number of purchased units. A new total of the purchased units will be equal to the previous total plus the number of refill units purchased.

Unfortunately, the serial number is susceptible to fraudulent use. For instance, the user who purchased refill units may copy down the serial number displayed on the secure web site and illegally share this serial number with friends or may even post the serial number on the Internet for all to see. Therefore, there is a need for a new method of purchasing refill units online.

SUMMARY OF INVENTION

It is therefore a primary objective of the claimed invention to provide a method for purchasing value units in order to solve the above-mentioned problems.

According to the claimed invention, a method of purchasing value units required for utilizing a paid function of a software program residing on a first computer is proposed. The method includes executing the software program on the first computer, establishing connection between the first computer and a second computer, and the first computer initiating an order with the second computer for a quantity of value units to be purchased. The method further includes the software program executed on the first computer receiving a serial number from the second computer, the software program storing the received serial number in a first location of a memory of the first computer, and transmitting a refill file from the second computer to a second location of the memory of the first computer, the refill file indicating the quantity of value units purchased and a confirmation number corresponding to the serial number. The method also includes loading the refill file from the second location of the memory of the first computer into the software program, comparing the confirmation number of the refill file with the serial number, and if the confirmation number of the refill file matches the serial number, adding the quantity of value units purchased to a previous total of value units and permanently deleting the serial number from the first location of the memory of the first computer.

It is an advantage of the claimed invention that the serial number is permanently deleted from the memory of the first computer so that the serial number cannot be shared with others. The claimed method prevents value units from being obtained fraudulently because the serial number is only available to those who purchase the value units legally.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 1:
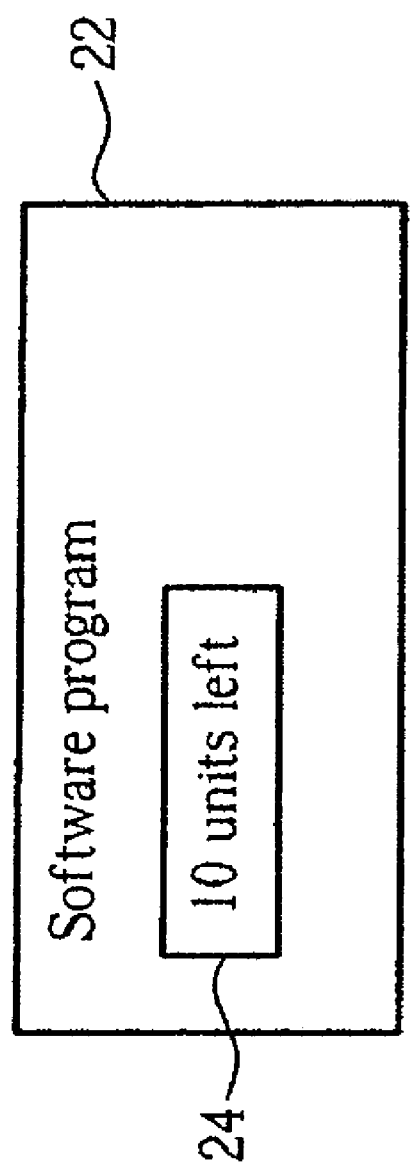
FIG. 1 is a diagram of a software program of the present invention.

Please refer to FIG. 1. FIG. 1 is a diagram of a software program 22 of the present invention. The software program 22 contains a paid function that needs to be paid for in the form of a purchased unit. The number of purchased units remaining is displayed in a quantity indicator 24. For example, as shown in FIG. 1, the quantity indicator 24 shows that ten purchased units are available. The paid function of the software program 22 can be used ten times before all of the purchased units are exhausted. In order to increase the number of available paid units, a user of the software program 22 may purchase refill units. The number of refill units purchased will be added to the number of available units to give a new total of available units.

Figure 2:
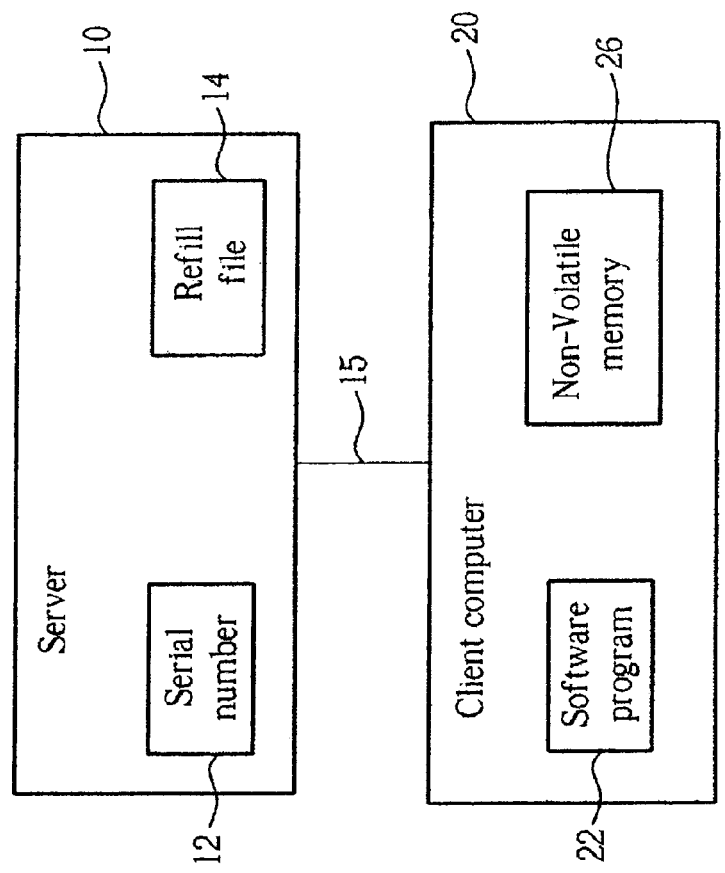
FIG. 2 is a block diagram of a client computer connected to a server according to the present invention.

Please refer to FIG. 2. FIG. 2 is a block diagram of a client computer 20 connected to a server 10 according to the present invention. The software program 22 is installed on the client computer 20. In order to purchase refill units for the software program 22, the client computer 20 establishes a connection 15 with the server 10. The connection 15 may be established through the Internet or through any kind of computer network. The client computer 20 can then purchase the refill units online through the connection 15 to the server 10. For instance, the server 10 may provide a web page interface for the user of the client computer 20 to purchase a desired quantity of refill units.

While the client computer 20 is placing an order for refill units with the server 10, the software program 22 is simultaneously run on the client computer 20. During the ordering process, the server 10 transmits a serial number 12 to the client computer 20. The software program 22 running on the client computer 20 receives the serial number 12 and stores the serial number 12 in a hidden location of a non-volatile memory 26 of the client computer 20. The user of the client computer 20 is not able to see where the serial number 12 is stored on the non-volatile memory 26, and this fact is what allows the present invention method to protect against fraudulent acquisitions of refill units. The non-volatile memory 26 is preferably a hard drive of the client computer 20, but may also be other memory types such as flash memory. Volatile memory can also be used, but non-volatile memory is preferred for more securely storing the serial number 12 in the event of power loss or power failures.

Later, after the order is completed, the server 10 will verify the purchase made by the user of the client computer 20. After the billing information such as name and credit card number are verified, the server 10 will transmit a refill file 14 to the client computer 20. The server 10 preferably sends the refill file 14 as an email attachment, although the user of the client computer 20 can also receive the refill file 14 in other ways, such as downloading the refill file 14 directly from the web site of the server 10. The refill file 14 is then stored on another location of the non-volatile memory 26, and should be saved in a location that is known and can be remembered by the user of the client computer 20.

Figure 3:
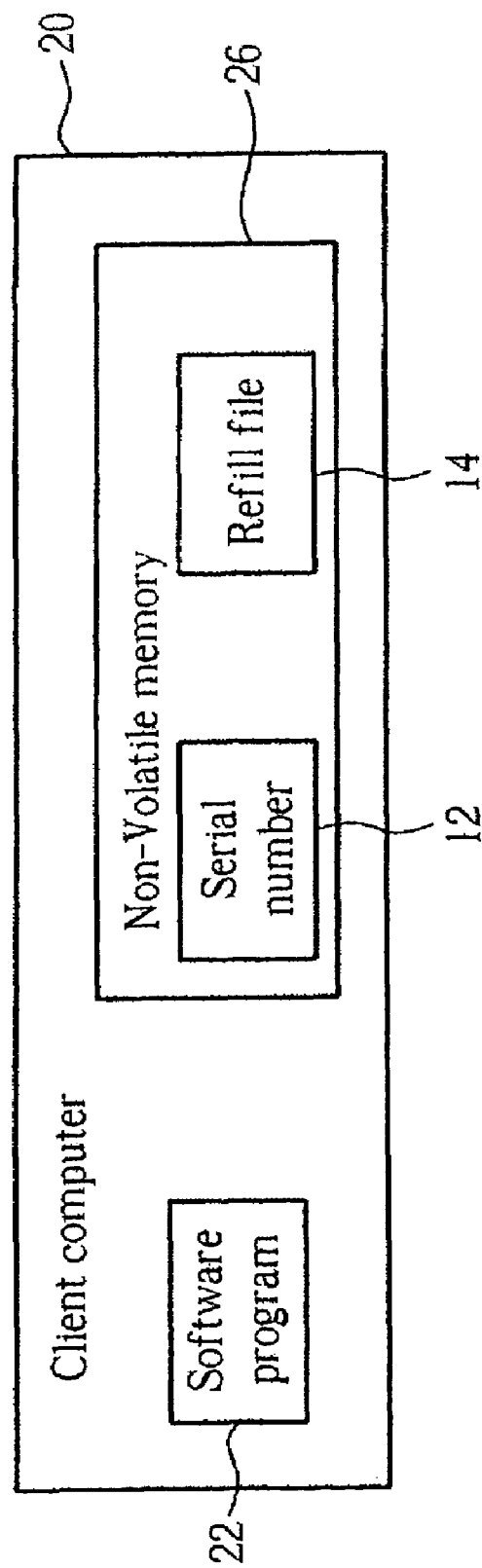
FIG. 3 is a block diagram of the client computer after receiving both the serial number and the refill file from the server.

Please refer to FIG. 3. FIG. 3 is a block diagram of the client computer 20 after receiving both the serial number 12 and the refill file 14 from the server 10. When the user of the client computer 20 has just received the refill file 14, both the serial number 12 and the refill file 14 are stored in the non-volatile memory 26. The user then loads the refill file 14 into the software program 22 in order to complete the process of refilling the purchased units. The refill file 14 contains information stating the number of refill units purchased. In addition, the refill file 14 also contains a confirmation number that corresponds to the serial number 12. The confirmation number does not have to be an exact copy of the serial number 12, but a relationship exists between the confirmation number and the serial number 12 to enable the software program 22 to determine the authenticity of the refill file 14. If the confirmation number of the refill file 14 matches the serial number 12, the number of refill units purchased will be added to the previous number of available units to give a new total of available units. Also, the software program 22 automatically permanently deletes the serial number 12 from the non-volatile memory 26 of the client computer 20 to prevent the serial number 12 from being used again in the future. After refilling the purchased units, the refill file 14 is no longer of any use, and can be deleted by the user of the client computer 20. If a refill file 14 is used which does not match the serial number 12 used by the software program 22, no purchased units will be added to the previous total. In other words, once the refill file 14 is used once, it cannot be used again by the user of the same client computer 20 or users of other computers.

In summary, the present invention method provides the secure online sale of refill units. Because the serial number 12 is hidden from users of the client computer 20, the user is not able to freely copy the serial number 12 and use it repeatedly. Moreover, the serial number 12 is automatically permanently deleted once the refill process is complete, thereby ensuring that the serial number 12 is not used fraudulently.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method of purchasing value units required for utilizing a paid function of a software program residing on a first computer, the method comprising:
   executing the software program on the first computer;
   establishing connection between the first computer and a second computer;
   the first computer initiating an order with the second computer for a quantity of value units to be purchased;
   the software program executed on the first computer receiving a serial number from the second computer;
   the software program storing the received serial number in a first location of a memory of the first computer;
   transmitting a refill file from the second computer to a second location of the memory of the first computer, the refill file indicating the quantity of value units purchased and a confirmation number corresponding to the serial number;
   loading the refill file from the second location of the memory of the first computer into the software program;
   comparing the confirmation number of the refill file with the serial number; and
   if the confirmation number of the refill file matches the serial number, adding the quantity of value units purchased to a previous total of value units and permanently deleting the serial number from the first location of the memory of the first computer.

2. The method of claim 1, wherein the second computer is a server.

3. The method of claim 2, wherein the first computer and the second computer communicate through a computer network.

4. The method of claim 2, wherein the first computer and the second computer communicate via the Internet.

5. The method of claim 1, wherein if the confirmation number of the refill file does not match the serial number, the previous total of value units is not changed and the serial number is not deleted from the first location of the memory of the first computer.

6. The method of claim 1, wherein the second computer transmits the refill file to the first computer as an attachment in an email message.

7. The method of claim 1, wherein the serial number is automatically transmitted from the second computer to the first location of the memory of the first computer without any action required by a user of the first computer.

8. The method of claim 1, wherein the first location is hidden from a user of the first computer.

9. The method of claim 1, wherein transmitting the refill file from the second computer to the second location of the memory of the first computer is performed after the order is completed and verified by the second computer.

10. The method of claim 1, wherein the memory of the first computer is a non-volatile memory.

* * * * *